United States Patent
Flacke

(10) Patent No.: US 7,362,261 B2
(45) Date of Patent: Apr. 22, 2008

(54) LINEAR FREQUENCY-MODULATED PULSE RADAR

(75) Inventor: Joachim Flacke, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 164 days.

(21) Appl. No.: 11/086,486

(22) Filed: Mar. 22, 2005

(65) Prior Publication Data
US 2005/0219116 A1    Oct. 6, 2005

(30) Foreign Application Priority Data
Mar. 31, 2004   (DE) ............... 10 2004 015 648

(51) Int. Cl.
*G01S 13/00* (2006.01)
*G01S 13/58* (2006.01)
*G01S 13/08* (2006.01)
*H01Q 3/00* (2006.01)

(52) U.S. Cl. ............... 342/132; 342/100; 342/109; 342/114; 342/134; 342/372

(58) Field of Classification Search ........... 342/134, 342/132, 15, 100
See application file for complete search history.

(56) References Cited

U.S. PATENT DOCUMENTS

| | | | |
|---|---|---|---|
| 3,274,594 A * | 9/1966 | Page ............... 342/204 |
| 4,384,291 A * | 5/1983 | Lewis et al. ............... 342/196 |
| 5,053,780 A | 10/1991 | Thaler et al. |
| 5,068,663 A * | 11/1991 | Valentine et al. ............... 342/20 |
| 5,245,347 A | 9/1993 | Bonta et al. |
| 5,298,962 A * | 3/1994 | Nourrcier ............... 356/5.09 |
| 5,351,053 A | 9/1994 | Wicks et al. |
| 5,506,582 A * | 4/1996 | Lawsine ............... 342/15 |
| 5,892,477 A * | 4/1999 | Wehling ............... 342/18 |
| 6,531,976 B1 * | 3/2003 | Yu ............... 342/16 |
| 6,693,590 B1 * | 2/2004 | Toplicar et al. ............... 342/383 |
| 6,965,341 B1 * | 11/2005 | Cho et al. ............... 342/25 A |
| 7,030,805 B2 * | 4/2006 | Ormesher et al. ............... 342/42 |
| 2002/0053953 A1* | 5/2002 | Edmonson et al. ............... 333/17.3 |
| 2003/0048214 A1 | 3/2003 | Yu |
| 2003/0117311 A1 | 6/2003 | Funai |
| 2004/0150548 A1* | 8/2004 | Walmsley ............... 342/70 |
| 2005/0046597 A1* | 3/2005 | Hutchison et al. ............... 340/917 |

FOREIGN PATENT DOCUMENTS

| | | |
|---|---|---|
| DE | 40 02 857 C1 | 9/1991 |
| EP | 0 403 085 A2 | 12/1990 |
| WO | WO2004/005961 | 1/2004 |

OTHER PUBLICATIONS

Introduction to Radra Systems, 3rd edition, 2001, p. 342.*
Carrara, Goodman, Majewski: "Spotlight Synthetic Aperture Radar", Artech House, 1995, pp. 26-31.

* cited by examiner

*Primary Examiner*—Thomas H. Tarcza
*Assistant Examiner*—Harry Liu
(74) *Attorney, Agent, or Firm*—Collard & Roe, P.C.

(57) ABSTRACT

A linear frequency-modulated pulse radar system is provided in which the echo signal is mixed with a de-ramp signal, in order to reduce the bandwidth. The transmission signal of the pulse radar and the de-ramp signal are generated with the same reference oscillator, whereby the transmission signal and the de-ramp signal are generated as the upper and lower side band of an upward mixing process.

8 Claims, 4 Drawing Sheets

LINEAR FREQUENCY-MODULATED PULSE RADAR

CROSS REFERENCE TO RELATED APPLICATIONS

Applicant claims priority under 35 U.S.C. §119 of German Application No. 10 2004 015 648.4 filed Mar. 31, 2004.

BACKGROUND OF THE INVENTION

1. Field of the Invention

The present invention relates to a linear frequency-modulated pulse radar in which the echo signal is mixed with a de-ramp signal, in order to reduce the bandwidth.

2. The Prior Art

The de-ramping method is also frequently referred to in the technical literature as the de-chirp method. This method is usually used in broadband pulse radar systems with linear frequency modulation (chirp signal), in order to reduce the bandwidth of the echo signal in the IF plane as described in Carrara, Goodman, Majewski: "Spotlight Synthetic Aperture Radar," Artech House, 1995, pages 26-31.

FIG. 1 illustrates the de-ramping method. When using the de-ramping method, a de-ramp signal is generated, which has the same chirp rate (bandwidth produced per time unit—corresponds to the incline in the frequency/time diagram) as the transmission signal; however, the de-ramp signal has a longer pulse duration and oscillates at a different mean frequency. The pulse duration of the de-ramp signal is selected so that the echo signals of the entire observation range are covered. This de-ramp signal is fed into the first downward mixer as the LO signal, with a delay. The resulting IF signal with an echo signal from a point target within the observation range is a non-modulated pulse (signal having fixed frequency and limited duration). The frequency of this pulse is dependent on the difference frequency between the transmission signal and the de-ramp signal, and on the running time of the echo signal. In FIG. 1, the first (echo signal 1) and the last (echo signal 2) of the echo signals received from the predetermined observation range are plotted. If the length and the delay of the de-ramp signal are adjusted accordingly, the bandwidth of all the echo signals from the target range is now determined only by the transmission signal shape and by the radial depth of the observation range. As is evident from FIG. 1, top and bottom diagram, the bandwidths of the echo signals mixed with the de-ramp signal are less than the bandwidth of the transmission signal.

Generation of the de-ramp signal takes place, according to the state of the art, in accordance with the structure described in FIG. 2. The transmission signal is first applied at the output of the signal generator SG. This signal is usually a pulse having a linear frequency increase within the pulse width (chirp signal).

The carrier frequency of this signal is an intermediate frequency IF1 predetermined by the system. The IF1 transmission signal is converted by means of the reference oscillator LOs, to the transmission frequency fs (first frequency processing channel) and emitted. The carrier frequencies (mean frequencies) of the frequency-modulated signal are shown in parentheses in the figures, at the line segments in question.

For the reception case, with a predetermined location of the observation range, the de-ramp signal is generated in the signal generator SG, with the same chirp rate and frequency as the transmission signal, but with a greater pulse width. In this way, the entire observation range is covered. The conversion of this de-ramp signal to a second intermediate frequency IF2 takes place by way of the reference oscillator LOdr (second frequency processing channel).

In the reception case, the echo signal (carrier frequency fs) is mixed with the de-ramp signal to a reception intermediate frequency IF, which is usually identical with IF1. Mixing to the base band takes place by way of the reference oscillator LObb. The base band can also contain a frequency offset, depending on the bandwidth and the possible sampling rate of the A/D converter.

In WO 2004/005961 A1, another frequency-modulated pulse radar is described, whereby the transmission signal and the de-ramp signal are generated with the same reference oscillator.

SUMMARY OF THE INVENTION

It is an object of the present invention to provide a pulse radar system having a high resolution, which is characterized by low technical effort and expenditure for the signal modulation, and which demonstrates great flexibility in use.

These and other objects are accomplished, in accordance with one aspect of the invention, by a linear frequency-modulator pulse radar system, in which the echo signal is mixed with a de-ramp signal, in order to reduce the bandwidth, and the transmission signal of the pulse radar system and the de-ramp signal are generated with the same reference oscillator. The transmission signal and de-ramp signal are generated as the upper and lower side band of an upward mixing process. Advantageous embodiments of the invention as well as a frequency-modulated radar system configured as a frequency step system are discussed below.

Both the upper and the lower side band can be used as the transmission signal or the de-ramp signal. The upward mixing process may be set up so that either the transmission signal or the de-ramp signal comes to lie for example in the Ku band, and the other signal, in each instance, comes to lie for example in the X band.

The linear frequency-modulated pulse radar system may be configured as a frequency step system, in which the bandwidth is increased by means of time-offset generation of several frequency modulated transmission signals having different mean frequencies, and in which the echo signals are mixed with several de-ramp signals assigned to the individual transmission signals. In this aspect, several reference oscillators are present, whereby a transmission signal and a de-ramp signal assigned to the transmission signal are generated using the same reference oscillator, whereby the transmission signal and the de-ramp signal are generated as the upper and lower side band of an upward mixing process, in each instance.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
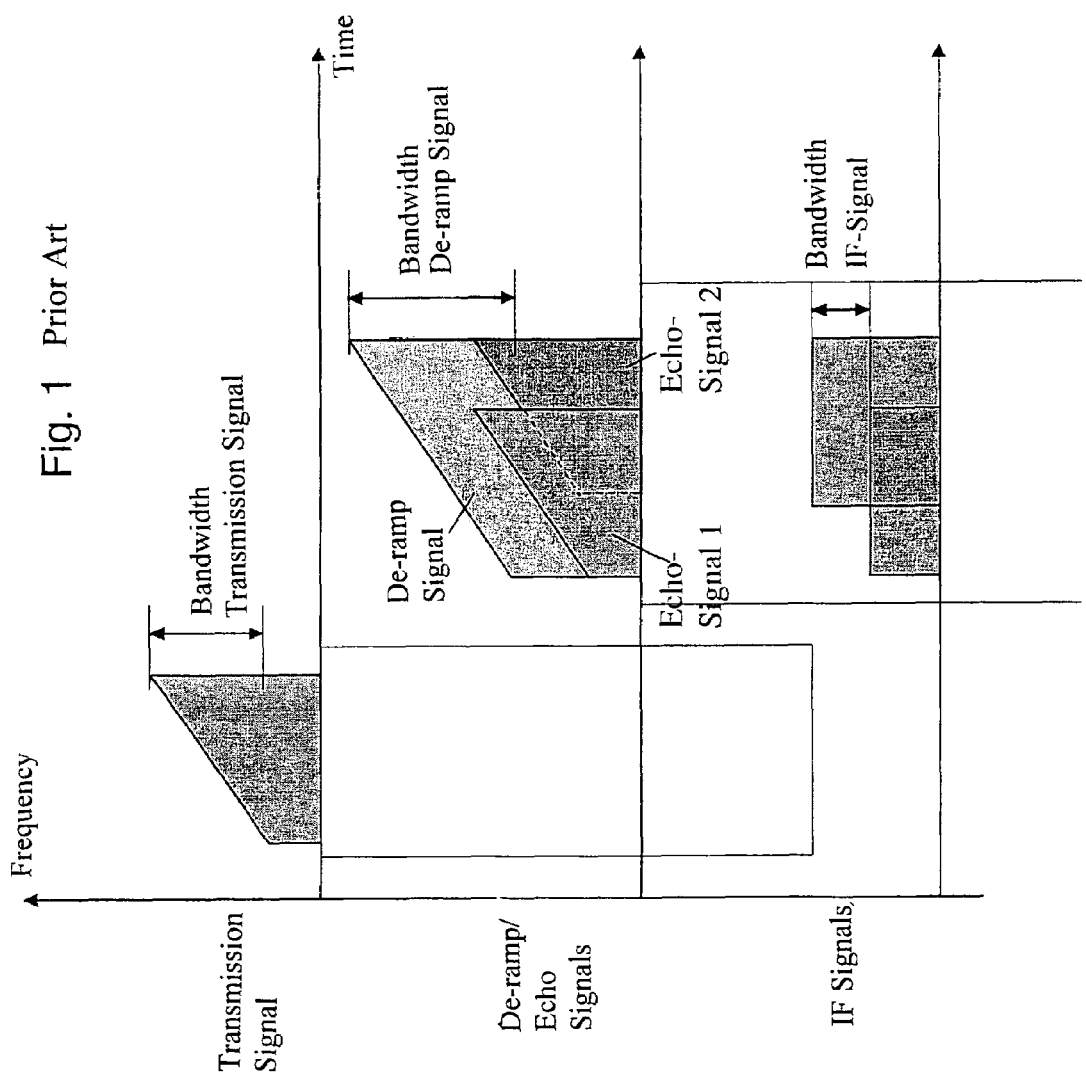
FIG. 1 shows frequency/time diagrams for the de-ramping method, as explained in the introduction to the specification prior art)
Figure 2:
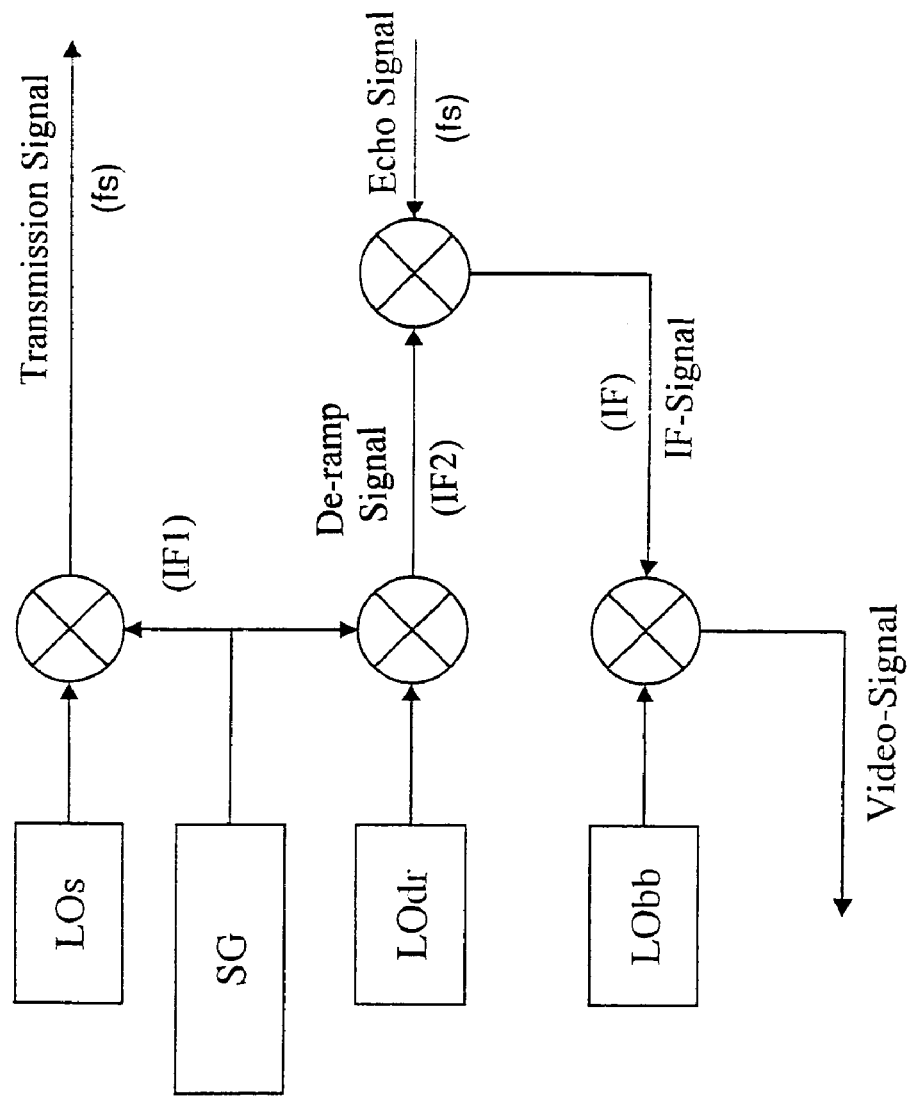
FIG. 2 shows the structure of a frequency-modulated radar system for carrying out the de-ramping method, as explained in the introduction to the specification (prior art)
Figure 3:
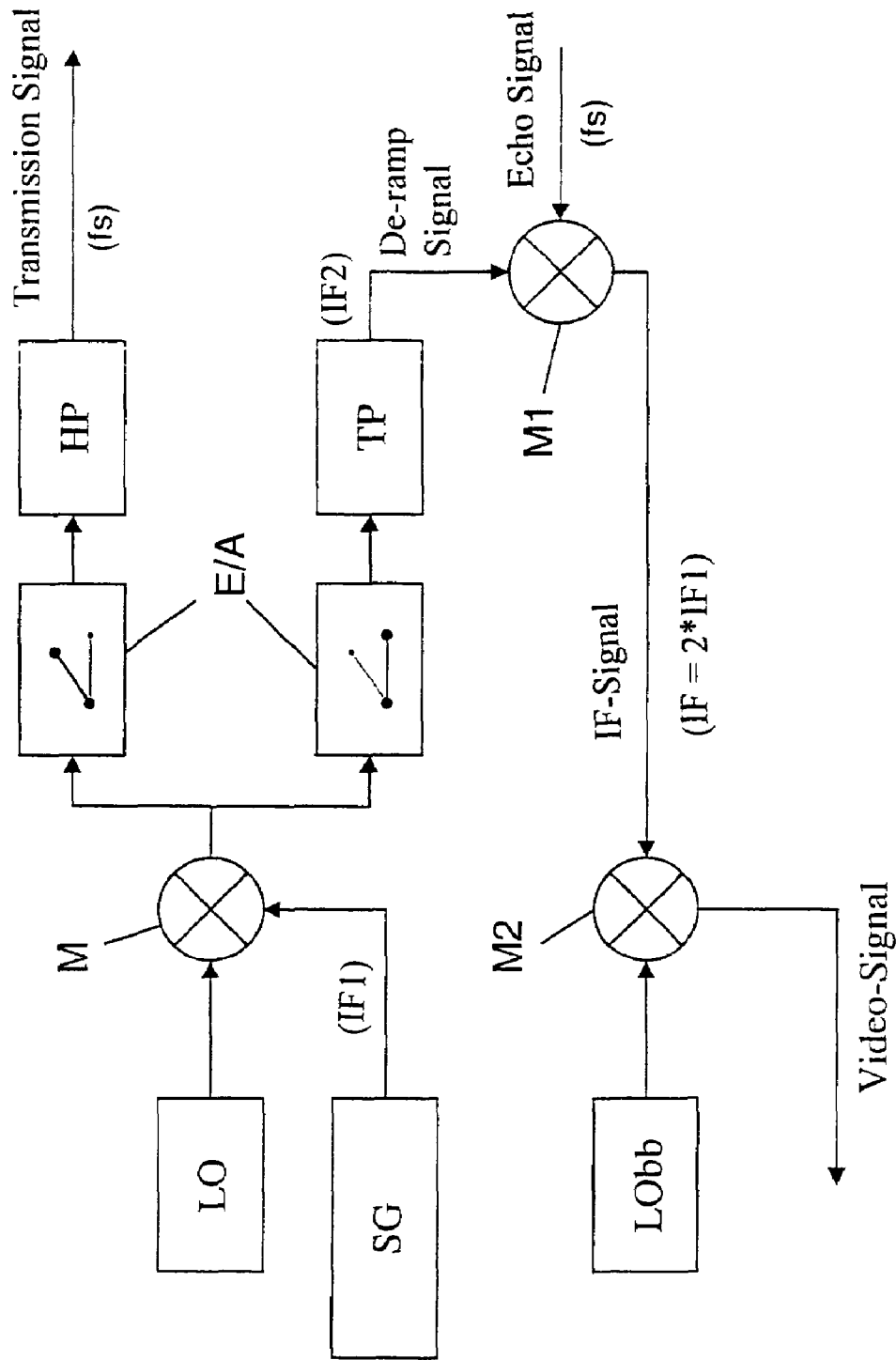
FIG. 3 shows an embodiment of the radar system according to the invention.

Referring now to the drawings, FIG. 3 shows an embodiment of the radar system according to the invention. The generation of transmission signal and de-ramp signal in the signal generator SG takes place in standard manner, as in the known methods, but with the difference that the frequency increase of the de-ramp signal takes place at the same amount but with the opposite sign as compared with the transmission signal. In the case of generation of transmission signal and de-ramp signal in a "digital chirp generator," the different incline of the two signals is implemented by corresponding programming of the digital chirp generator.

The conversion of the transmission signal generated by the signal generator SG (carrier frequency IF1) to the transmission frequency fs, or of the de-ramp signal to the frequency IF2, takes place with the inclusion of only one reference oscillator LO at the mixer M. The upper side band of the mixing process is used for the transmission signal, and the lower side band is used for the de-ramp signal, or vice versa.

For this purpose, the output signal of the mixer M is divided into two branches. In the upper branch, which is intended for the transmission signal, a high-pass filter HP is located, so that the upper side band of the upward mixing process (frequency fs) is applied at the output of this branch. In the lower branch, which is intended for the de-ramp signal here, a low-pass filter TP is located. Accordingly, the lower side band of the upward mixing process (frequency IF2) is present at the output of this branch.

Both in the branch for the upper side band and in the branch for the lower side band, an on/off switch E/A is provided. These serve to prevent disruptive interactions between the two branches. In the transmission case, the branch for the de-ramp signal is interrupted. In the reception case, the branch for the transmission signal is interrupted.

As an alternative to the embodiment shown in FIG. 3, the upper side band, guided in the upper branch, can also be passed to the mixer M1, so that it serves as the de-ramp signal. Correspondingly, the lower side band, guided in the lower branch, is fed into the transmission path of the radar device, so that it serves as the transmission signal.

In the manner described, a transmission signal may be generated in the Ku band (mean frequency 16.5 Ghz), with a de-ramp signal in the X band (mean frequency 9.5 GHz), or vice versa (the transmission signal in the X band and the de-ramp signal in the Ku band). This signal generation may be done using a system with an IF1 of 3.5 GHz, for example, having only one reference oscillator LO that oscillates at a fixed frequency of 13 GHz, for example, and an upward mixer M. In both cases, as described, only one frequency conversion channel is required.

Because of the reverse frequency increase between the transmission signal and the de-ramp signal, both the upper side band and the lower side band have the same frequency increases within the pulse after the mixing process in the upward mixer M. Mixing in the reception case, at the mixer M1, always results in a signal that oscillates at twice IF1.

The necessary generation of the LO signal for mixing to the base band, at the mixer M2, can take place by means of simple multiplication of the LO signal used in the signal generation. With corresponding frequency conversion in the signal generation, the frequency offset in the base band is also possible.

Using the structure of the radar system according to the invention, it is therefore possible to make do with a single frequency-conversion channel. De-ramp signal and transmission signal are generated at the same mixer M, using the same reference oscillator LO.

The invention furthermore provides a broadband radar system having high resolution, with selectable frequency bands. A choice can be made between two frequency bands for transmission signal and echo signal processing, without having to change the hardware of the radar system.

Figure 4:
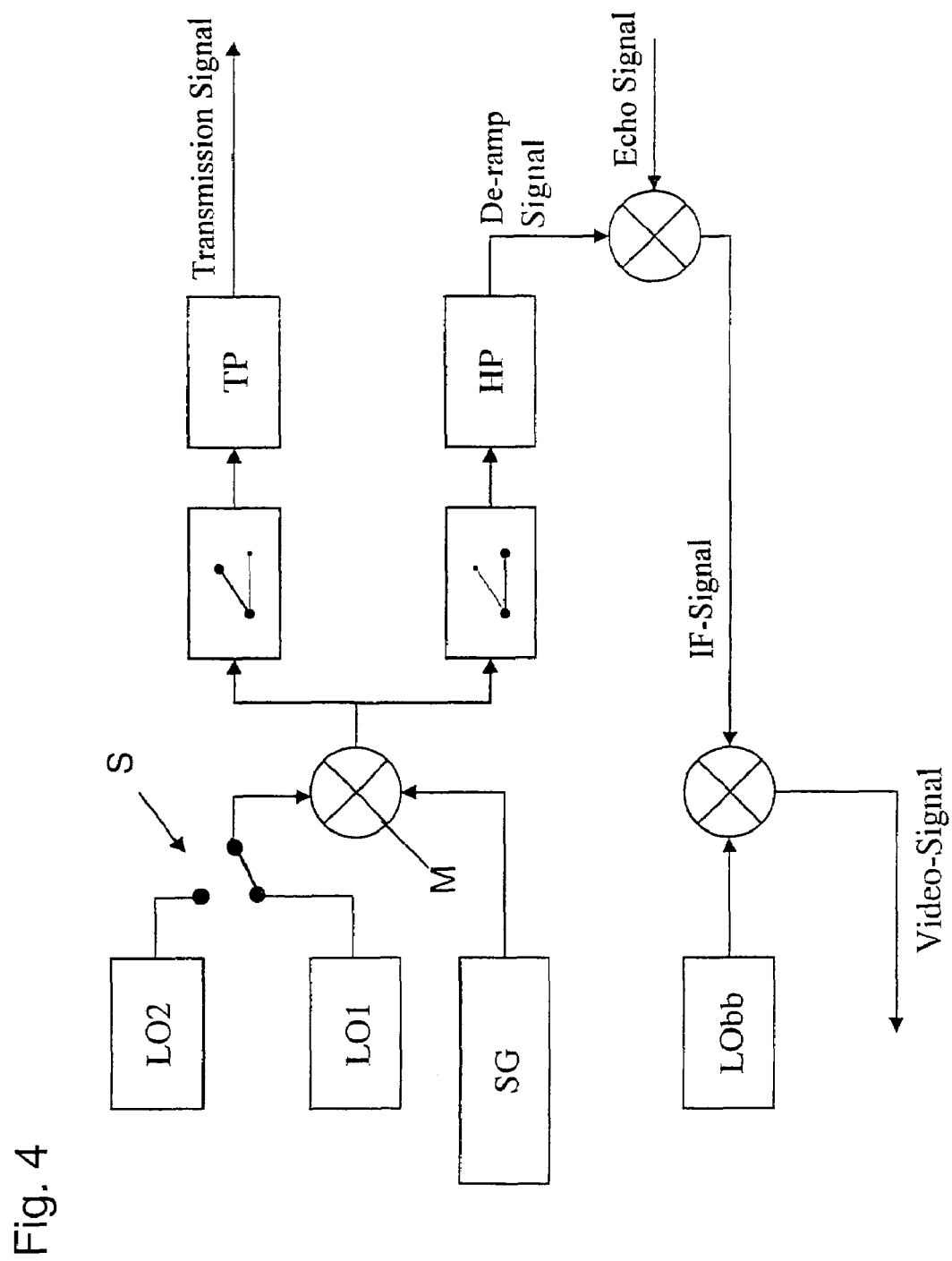
FIG. 4 shows a radar system according to the invention, configured as a frequency step system.

The principle on which the invention is based can also be used in those linear frequency-modulated pulse radars that are configured as a so-called step frequency system. One such system, for example, is described in U.S. Pat. No. 6,531,976 B1. In such systems, the bandwidth is increased by means of time-offset generation of several frequency-modulated transmission signals having different mean frequencies. For example, two transmission signals can be transmitted alternately in terms of time, which both have the same chirp rate (same incline in a frequency/time diagram), whereby the maximum frequency of the one signal corresponds to the minimum frequency of the other signal. For each transmission signal, a suitable de-ramp signal is generated, so that for each transmission signal, the de-ramping method described above can be carried out separately. In accordance with the invention, a transmission signal and the related de-ramp signal can be generated as the upper and lower side band of an upward mixing process. FIG. 4 shows the implementation of such a frequency step radar system. The structure of this radar system differs from that according to FIG. 3 merely in that instead of one reference oscillator, now two reference oscillators LO1, LO2 are present. These two reference oscillators can be optionally connected with the input of mixer M by way of a switch S. To generate the first transmission signal and related de-ramp signal, LO1 is connected with the mixer M.

To generate the second transmission signal and related de-ramp signal, the mixer M is connected with the second reference oscillator LO2.

Although only a few embodiments of the present invention have been shown and described, it is to be understood that many changes and modifications may be made thereunto without departing from the spirit and scope of the invention as defined in the appended claims.

What is claimed is:

1. A linear frequency-modulated pulse radar system wherein an echo signal is mixed with a frequency-modulated de-ramp signal, said frequency-modulated de-ramp signal having the same chirp-rate as the transmission signal of the pulse radar and having a longer pulse duration and oscillating at a different mean frequency compared to the transmission signal of the pulse radar in order to reduce bandwidth, comprising a reference oscillator generating both a transmission signal of the pulse radar system and the de-ramp signal, said transmission signal and said de-ramp signal being generated as an upper and a lower side band of an upward mixing process of the signal of a signal generator whereas for generation of said transmission signal and said de-ramp signal the same mixer is used.

2. The pulse radar system according to claim 1, wherein both the upper and the lower side band can be used as the transmission signal or the de-ramp signal.

3. The pulse radar system according to claim 1, wherein the upward mixing process is set up so that one of said transmission signal and said de-ramp signal comes to lie in a Ku band, and another of said transmission signal and said de-ramp signal, in each instance, comes to lie in an X band.

4. A linear frequency-modulated pulse radar system comprising a frequency step system wherein bandwidth is increased via time-offset generation of a plurality of frequency-modulated transmission signals having different mean frequencies and wherein echo signals are mixed with a plurality of frequency-modulated de-ramp signals assigned to the individual transmission signals whereas in each case the assigned de-ramp signal has the same chirp-rate as the respective transmission signal and has a longer pulse duration and oscillates at different mean frequencies compared to the respective transmission signal, comprising a plurality of reference oscillators, a respective one of said plurality of reference oscillators generating a transmission signal and a de-ramp signal assigned to the transmission signal, said transmission signal and said de-ramp signal being generated as an upper and a lower side band of an upward mixing process in each instance, whereas for generation of said transmission signal and said de-ramp signal the same mixer is used.

5. A method of obtaining a linear frequency-modulated pulse radar system comprising the steps of:
   (a) generating as an upper and a lower side band of an upward mixing process a transmission signal of the pulse radar system and a frequency-modulated de-ramp signal with one reference oscillator, the frequency-modulated de-ramp signal having the same chirp-rate as the transmission signal of the pulse radar and having a longer pulse duration and oscillating at a different mean frequency compared to the transmission signal of the pulse radar; and
   (b) mixing an echo signal with the de-ramp signal in a mixer in order to reduce bandwidth;
   wherein for generation of the transmission signal and the de-ramp signal the same mixer is used.

6. The method according to claim 5 wherein both the upper and the lower side band can be used as the transmission signal or the de-ramp signal.

7. The method according to claim 5 wherein the upward mixing process is set up so that one of said transmission signal and said de-ramp signal comes to lie in a Ku band and another of said transmission signal and said de-ramp signal, in each instance, comes to lie in an X band.

8. A method of obtaining a linear frequency-modulated pulse radar system comprising a frequency step system comprising the steps of:
   (a) increasing bandwidth by time-offset generation of a plurality of frequency-modulated transmission signals having different mean frequencies; and
   (b) mixing in a mixer a plurality of echo signals with a plurality of frequency-modulated de-ramp signals assigned to the individual transmission signals;
   wherein a plurality of reference oscillators are provided and a respective one of the plurality of reference oscillators generates a transmission signal and a de-ramp signal assigned to the transmission signal, the transmission signal and the de-ramp signal being generated as an upper and a lower side band of an upward mixing process in each instance;
   wherein in each case the assigned de-ramp signal has the same chirp rate as the respective transmission signal and has a lower pulse duration and oscillates at different mean frequencies compared to the respective transmission signal; and
   wherein for generation of the transmission signal and the de-ramp signal the same mixer is used.

* * * * *